United States Patent
Doshi et al.

(10) Patent No.: US 9,952,941 B2
(45) Date of Patent: Apr. 24, 2018

(54) ELASTIC VIRTUAL MULTIPATH RESOURCE ACCESS USING SEQUESTERED PARTITIONS

(71) Applicant: INTEL CORPORATION, Santa Clara, CA (US)

(72) Inventors: Kshitij A. Doshi, Chandler, AZ (US); Rahul Khanna, Portland, OR (US); Minh Tung Duy Le, North Plains, OR (US); Paul H. Dormitzer, Acton, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/916,768

(22) PCT Filed: Dec. 19, 2013

(86) PCT No.: PCT/US2013/076406
§ 371 (c)(1),
(2) Date: Mar. 4, 2016

(87) PCT Pub. No.: WO2015/094260
PCT Pub. Date: Jun. 25, 2015

(65) Prior Publication Data
US 2016/0292050 A1 Oct. 6, 2016

(51) Int. Cl.
*G06F 11/14* (2006.01)
*G06F 11/20* (2006.01)

(52) U.S. Cl.
CPC ...... *G06F 11/1471* (2013.01); *G06F 11/2033* (2013.01); *G06F 11/2035* (2013.01);
(Continued)

(58) Field of Classification Search
CPC ............. G06F 11/1471; G06F 11/2033; G06F 11/2035; G06F 11/2043; G06F 11/07;
(Continued)

(56) References Cited

U.S. PATENT DOCUMENTS 5,815,651 A 9/1998 Litt
6,240,501 B1* 5/2001 Hagersten ........... G06F 11/0712
711/170
(Continued)

FOREIGN PATENT DOCUMENTS

EP          1187024 A2    3/2002
JP       2002-082816 A    3/2002
(Continued)

OTHER PUBLICATIONS

Notice of Reason for Rejection and English Translation for Japanese Patent Application No. 2016-526900, dated Jun. 6, 2017, 7 pages.
(Continued)

*Primary Examiner* — Bryce P Bonzo
*Assistant Examiner* — Anthony J Amoroso
(74) *Attorney, Agent, or Firm* — Barnes & Thornburg LLP

(57) ABSTRACT

Technologies for virtual multipath access include a computing device configured to sequester a recovery partition from a host partition while allowing the recovery partition to access one or more resources of the host partition such as host memory or data storage. A remote computing device determines whether the host partition is responsive. The recovery partition receives a request for host state data of the host partition from the remote computing device in response to a determination that the host partition is not responsive. The recovery partition retrieves the requested host state data using a host state index maintained by the host partition and transmits the requested host state data to the remote com-
(Continued)

puting device. The host state index may identify the location of the requested host state data. The remote computing device may perform a recovery operation based on the received host state data. Other embodiments are described and claimed.

20 Claims, 6 Drawing Sheets

(52) U.S. Cl.
CPC .... *G06F 11/2043* (2013.01); *G06F 2201/805* (2013.01); *G06F 2201/85* (2013.01)

(58) Field of Classification Search
CPC .............. G06F 11/0703; G06F 11/0709; G06F 11/0712; G06F 11/14; G06F 11/1402; G06F 11/1484; G06F 2201/805; G06F 2201/85; G06F 9/50; G06F 9/5061; G06F 9/5077

See application file for complete search history.

(56) References Cited

U.S. PATENT DOCUMENTS

| | | | |
|---|---|---|---|
| 2003/0159086 A1* | 8/2003 | Arndt | G01B 21/20 714/25 |
| 2004/0210793 A1* | 10/2004 | Chokshi | G06F 11/0712 714/5.11 |
| 2008/0005609 A1* | 1/2008 | Zimmer | G06F 11/0748 714/5.11 |
| 2008/0120486 A1 | 5/2008 | Ritz et al. | |
| 2010/0161565 A1 | 6/2010 | Lee et al. | |
| 2012/0144233 A1* | 6/2012 | Griffith | G06F 11/1443 714/13 |
| 2013/0054869 A1* | 2/2013 | Tolia | G06F 12/0871 711/102 |

FOREIGN PATENT DOCUMENTS

| | | |
|---|---|---|
| JP | 2007-133544 A | 5/2007 |
| JP | 2008-533573 A | 8/2008 |
| WO | 2007-020118 | 2/2007 |

OTHER PUBLICATIONS

International Search Report for PCT/US13/076406, dated Sep. 18, 2014 (3 pages).

Written Opinion for PCT/US13/076406, dated Sep. 18, 2014 (5 pages).

European Search Report for Patent Application No. 13899511.3-1954/3084617, dated Dec. 12, 2017, 9 pages.

* cited by examiner

ELASTIC VIRTUAL MULTIPATH RESOURCE ACCESS USING SEQUESTERED PARTITIONS

CROSS REFERENCE TO RELATED APPLICATIONS

This application is a national stage entry under 35 USC § 371(b) of International Application No. PCT/US2013/076406, which was filed Dec. 19, 2013.

BACKGROUND

Many typical applications executing in computing clusters, including cloud computing clusters, require a high level of availability, redundancy, or other measures of robustness. In such applications, state data is typically propagated throughout the computing cluster to prevent introducing a single node as a point of failure. For example, business-critical applications such as sales and customer billing systems typically must be failsafe against a single point of failure. A node in a computing cluster may be brought down due to any combination of hardware failure, software failure, network failure, power failure, or other unplanned outage. However, software failures (including software bugs, software misconfigurations, crashes due to transient hardware errors, and all other software failures) are typically more common than any other failure source.

In some systems, application state may be propagated through a computing cluster through synchronous update messages sent between all of the nodes of the cluster. Additionally or alternatively, in some systems the application state may be logged synchronously to global storage such as a storage area network or network attached storage volume. In such applications, synchronization between nodes and/or global storage is a major source of communication overhead, equipment and facility costs, and complexity, and also reduces the flexibility of the system. Additionally, such systems fail to scale to large numbers of nodes, such as those needed for cloud computing applications.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
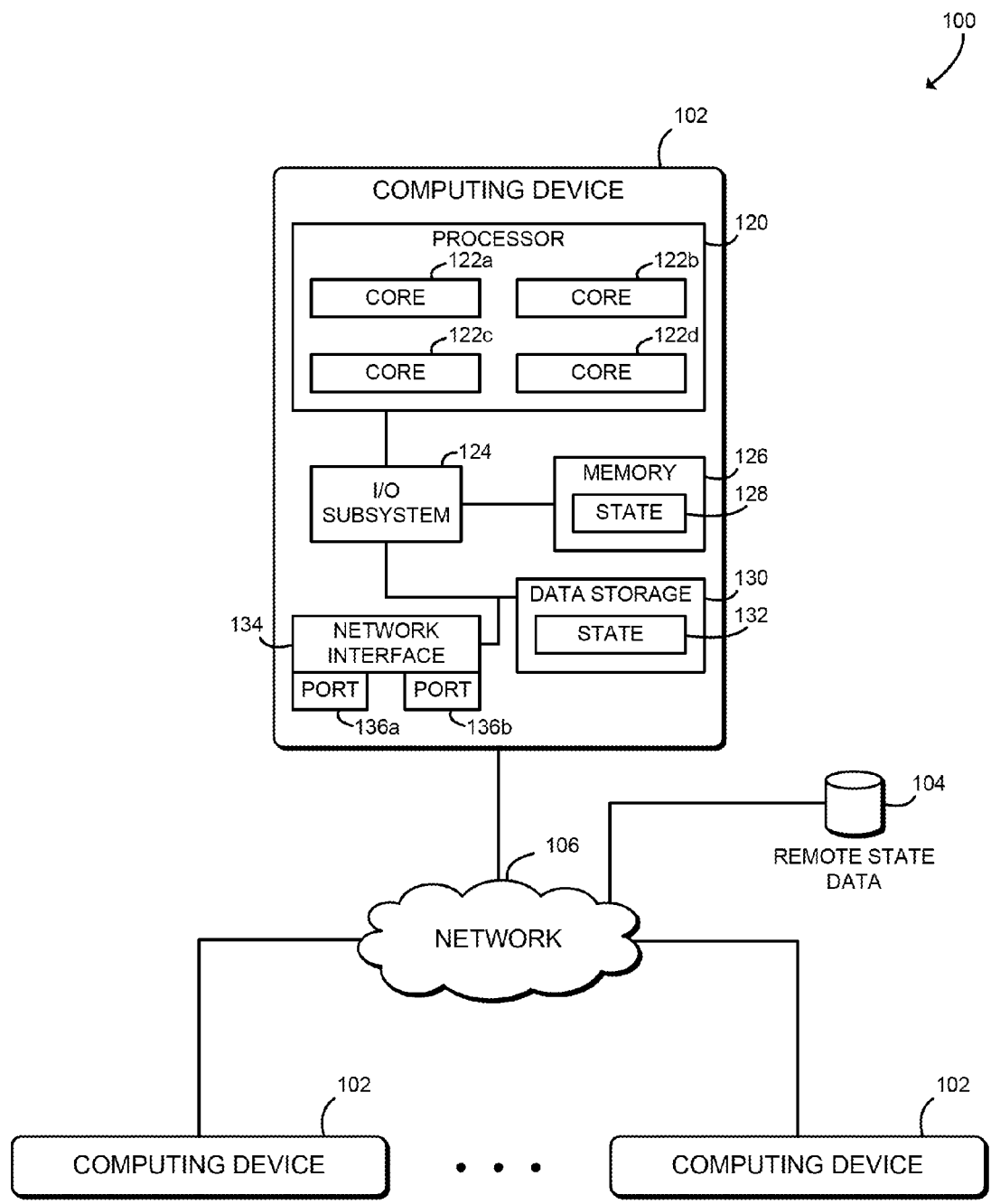
FIG. 1 is a simplified block diagram of at least one embodiment of a system for elastic virtual multipath resource access.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in one embodiment, a system 100 for virtual multipath resource access includes a number of computing devices 102 in communication over a network 106. In use, as discussed in more detail below, each computing device 102 may use platform firmware and/or hardware to establish two sequestered computing domains, a host partition and a recovery partition. The host partition executes host applications, a host operating system, and/or a virtual machine monitor, and asynchronously propagates state changes to remote state data 104 through the other computing devices 102 of the system 100. If the host partition crashes or becomes unresponsive, the recovery partition responds to requests from other computing devices 102 for host state data. The recovery partition accesses resources of the host partition such as memory and/or data storage, and returns the requested data to the remote computing devices 102. Particular embodiments of techniques for sequestering the host partition and the recovery partition are further described below. The remote computing devices 102 may use the received host state data to update the remote state data 104 or perform other recovery operations. The illustrative system 100 includes a number of homogeneous computing devices 102; however, in some embodiments the system 100 may include other devices such as dedicated backup/high availability/disaster recovery devices.

By allowing asynchronous access to the host state data through the recovery partition, the system 100 allows for on-demand multipath access to state data using ordinary server hardware. The use of ordinary hardware may reduce costs compared to comparatively exotic hardware including, for example, multiport memory or data storage devices. Additionally, on-demand multipath access allows each of the computing devices 102 to continue processing host applications without completely synchronizing the remote state data 104. Thus, the system 100 may have increased scalability and performance. Robustness and/or correctness of the system 100 may be largely unchanged compared to systems with synchronized remote state updates, because hardware faults that disable an entire computing device 102 are much less likely than software or other transient faults that disable only the host partition. Furthermore, isolating the recovery and host partitions allows for the recovery partition to be small and reliable, which may increase robustness of the system 100.

Each computing device 102 may be embodied as any type of computing device capable of performing the functions described herein, including, without limitation, a computer, a multiprocessor system, a server, a rack-mounted server, a blade server, a laptop computer, a notebook computer, a network appliance, a web appliance, a distributed computing system, a processor-based system, and/or a consumer electronic device. As shown in FIG. 1, the computing device 102 includes a multi-core processor 120, an input/output subsystem 124, a memory 126, a data storage device 130, and network interface 134. Of course, the computing device 102 may include other or additional components, such as those commonly found in a server device (e.g., various input/output devices), in other embodiments. Additionally, in some embodiments, one or more of the illustrative components may be incorporated in, or otherwise form a portion of, another component. For example, the memory 126, or portions thereof, may be incorporated in one or more processor 120 in some embodiments.

The processor 120 may be embodied as any type of processor capable of performing the functions described herein. The illustrative processor 120 is a multi-core processor, however in other embodiments each processor 120 may be embodied as a single or multi-core processor(s), digital signal processor, microcontroller, or other processor or processing/controlling circuit. The illustrative processor 120 includes four processor cores 122, each of which is an independent processing unit capable of executing programmed instructions. Although the illustrative processor 120 includes four processor cores 122a through 122d, the processor 120 may include a fewer or greater number of processor cores 122 in other embodiments.

The memory 126 may be embodied as any type of volatile or non-volatile memory or data storage capable of performing the functions described herein. In operation, the memory 126 may store various data and software used during operation of the computing device 102 such as operating systems, applications, programs, libraries, and drivers. The memory 126 may also store host state 128, which may be replicated across the system 100 and recovered in the event of a crash, as described further below. The memory 126 is communicatively coupled to the processor 120 via the I/O subsystem 124, which may be embodied as circuitry and/or components to facilitate input/output operations with the processor 120, the memory 126, and other components of the computing device 102. For example, the I/O subsystem 124 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 120, the memory 126, and other components of the computing device 102, on a single integrated circuit chip.

The data storage device 130 may be embodied as any type of device or devices configured for short-term or long-term storage of data such as, for example, memory devices and circuits, memory cards, hard disk drives, solid-state drives, or other data storage devices. The data storage device 130 may store host state 132, which may be replicated across the system 100 and recovered in the event of a crash, as described further below. The host state 132 of the data storage device 130 may serve as backing store (e.g., swap space) for or otherwise copy the host state 128 of the memory 126, or may be unique.

The network interface 134 of the computing device 102 may be embodied as any communication circuit, device, or collection thereof, capable of enabling communications between the computing device 102 and other remote devices over the network 106. The network interface 134 may be configured to use any one or more communication technology (e.g., wired or wireless communications) and associated protocols (e.g., Ethernet, Bluetooth®, Wi-Fi®, WiMAX, etc.) to effect such communication. The illustrative network interface 134 is embodied as an Ethernet adapter including two ports 136. Each of the ports 136a, 136b allows independent access to remote hosts over the network 106, and the ports 136 may be sequestered, partitioned, and/or otherwise isolated from each other. In other embodiments, the network interface 134 may be embodied as a virtual-machine-device queue-enabled network interface card having at least two virtual network interfaces, embodied as a pair of physical network adapters, or embodied as any other network interface allowing sequestered and/or independent access to the network 106.

The remote state data 104 stores information that is propagated for consistency of state among the different entities of the system 100, including the state of distributed applications, databases, the state 128, 132 of particular computing devices 102, or other distributed data. The remote state data 104 may be embodied as a dedicated database server, distributed data storage, or any other data storage system capable of maintaining consistent state for the system 100. As such, copies or portions of the remote state data 104 may be stored in the data storage device 130 and/or memory 126 of each computing device 102. The remote state data 104 may be replicated or updated asynchronously such that the remote state data 104 eventually corresponds to the state of individual computing devices 102.

As discussed in more detail below, the computing devices 102 are configured to transmit and receive data with each other, the remote state data 104, and/or other devices of the system 100 over the network 106. The network 106 may be embodied as any number of various wired and/or wireless networks. For example, the network 106 may be embodied as, or otherwise include, a wired or wireless local area network (LAN), a wired or wireless wide area network (WAN), a cellular network, and/or a publicly-accessible, global network such as the Internet. As such, the network 106 may include any number of additional devices, such as additional computers, routers, and switches, to facilitate communications among the devices of the system 100.

Figure 2:
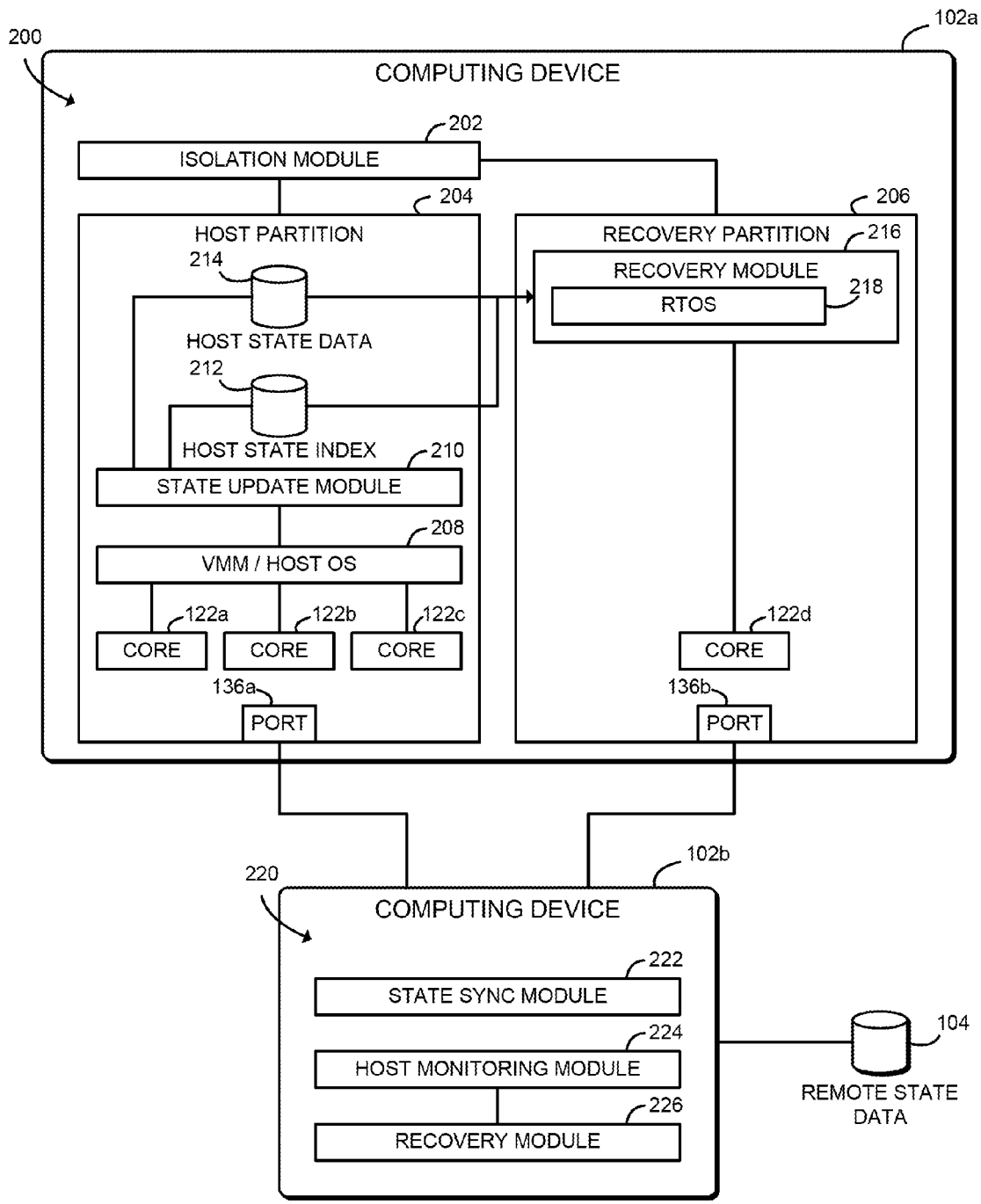
FIG. 2 is a simplified block diagram of at least one embodiment of various environments that may be established by the system of FIG. 1.

Referring now to FIG. 2, in an illustrative embodiment, a computing device 102a establishes an environment 200 during operation. The illustrative environment 200 includes an isolation module 202, a host partition 204, and a recovery partition 206. The various modules of the environment 200 may be embodied as hardware, firmware, software, or a combination thereof.

The isolation module 202 is configured to sequester the recovery partition 206 from the host partition 204. Sequestering the partitions 204, 206 may establish strict computational and/or storage isolation and access control that may be enforced by hardware and/or firmware of the computing device 102a. Thus, sequestration prevents uncontrolled sharing of resources between the host partition 204 and/or the recovery partition 206. However, the sequestration is asymmetric, meaning that the recovery partition 206 has at least read-only access to resources of the host partition 204, including segments of the memory 126 and/or the data storage device 130. The isolation module 202 may use hardware, pre-boot firmware, or any other technique to sequester components of the computing device 102a without relying on a virtual machine manager (VMM) or operating system. Such low-level sequestration may thus tolerate software faults within the VMM and/or operating system.

The host partition 204 is assigned a subset of the hardware resources of the computing device 102a. In the illustrative embodiment, the host partition 204 has been assigned the network port 136a and the processor cores 122a, 122b, 122c. Thus, to any modules of the host partition 204, the computing device 102a may be presented and/or detected as having a three-core processor 120 and a single-port network interface 134. The host partition 204 further includes a VMM/host operating system 208, a state update module 210, a host state index 212, and host state data 214. Of course, in other embodiments, other or additional resources may be assigned to the host partition 204.

The VMM/host operating system (OS) 208 may be embodied as any virtual machine monitor, hypervisor, general operating system, specialized operating system, or other component that allows an application workload to be executed on the computing device 102a. The VMM/host OS 208 may host and/or execute a number of virtual machine instances, daemons, server processes, or any other application to perform computations and/or provide services. For example, the VMM/host OS 208 may host a number of virtual machines providing a business application such as processing customer billing. During execution the VMM/host OS 208 or any applications hosted within may generate changes to the host state data 214 of the host partition 204.

The state update module 210 is configured to maintain the host state index 212 and update the host state data 214. The state update module 210 may log updates to the host state data 214 in the host state index 212 prior to updating the host state data 214. In some embodiments, the state update module 210 may transmit the host state updates to one or more remote computing devices 102. For example, the state update module 210 may transmit the host state updates to one or more high availability/disaster recovery peer computing devices 102b, as described below. Thus, the state update module 210 ensures that the host state index 212 and the host state data 214 are maintained in a consistent state within the host partition 204, and may transmit host state data to update other computing devices 102 of the system 100.

The host state data 214 includes any data accessible to the host partition 204 that defines, describes, or otherwise relates to the state of the VMM/host OS 208 or any applications hosted within. For example, the host state data 214 may include the host state 128 stored within the memory 126, the host state 132 stored within the data storage device 130, or any combination of that data. In some embodiments, the host state data 214 may include raw data. Additionally or alternatively, the host state data 214 may include logical application data. For example, the host state data 214 may define or describe the state of any number of named application objects such as variables, data structures, databases, database records, files, storage volumes, or similar application objects. The host state index 212 may be embodied as any data structure that allows the computing device 102a to navigate through and retrieve data from the host state data 214. The host state index 212 may describe the hierarchy and other relationships between application objects, and may store the location of application objects in the memory 126 and/or the data storage device 130. The host state index 212 stores data in a manner that is usable by all components of the computing device 102a, including the recovery partition 206. For example, the host state index 212 may be embodied as a key-value map that associates application object identifiers to virtual addresses within the memory 126. In that example, the host state index 212 may further include page translation tables to convert virtual addresses into physical addresses within the memory 126.

The recovery partition 206 is assigned a subset of the hardware resources of the computing device 102a. In the illustrative embodiment, the recovery partition 206 has been assigned the network port 136b and the processor core 122d. Thus, to any modules of the recovery partition 206, the computing device 102a may be presented and/or detected as having a single-core processor 120 and a single-port network interface 134. The recovery partition 206 further includes a recovery module 216. Of course, in other embodiments, other or additional resources may be assigned to the recovery partition 206.

The recovery module 216 is configured to receive a request for host state data 214 from a remote computing device 102 (e.g., computing device 102b of FIG. 2), retrieve the requested host state data 214, and transmit the requested host state data 214 back to the remote computing device 102. In some embodiments, the recovery module 216 may receive requests from a high availability/disaster recovery peer computing device 102b, after that computing device 102b has detected that the host partition 204 is not responsive. As described above, the recovery module 216 may access the host state index 212 to locate the requested host state data 214, regardless of the state of the host partition 204.

The recovery module 216 may further include, or be embodied as, a real-time operating system (RTOS) 218. The RTOS 218 may be embodied as a simple execution environment designed for robust and deterministic execution. For example, the RTOS 218 may be embodied as a finite state automaton architecture, which may allow the operation of the RTOS 218 to be verifiably correct. Thus, the functions of the recovery module 216 may be performed by a verifiably correct RTOS 218 executing in an isolated recovery partition 206, all of which may increase the robustness of the computing device 102a.

Still referring to FIG. 2, in an illustrative embodiment, the computing device 102a may be in communication over the network 106 with a computing device 102b acting as a high availability or disaster recovery peer. The computing device 102b may establish an environment 220 during operation. The illustrative environment 220 includes a state synchronization module 222, a host monitoring module 224, and a recovery module 226. The various modules of the environment 220 may be embodied as hardware, firmware, software, or a combination thereof.

The state synchronization module 222 is configured to receive updated host state data 214 from the computing device 102a. The state synchronization module 222 may apply those host state updates to the remote state data 104, thus synchronizing the remote state of the system 100 with the local state of the computing device 102a. In some embodiments, the state synchronization module 222 may transmit the host state updates to additional computing devices 102 thus propagating changes in host state data 214 through the system 100.

The host monitoring module 224 is configured to monitor the computing device 102a and determine whether the host partition 204 is responsive. The host partition 204 may be unresponsive in response to a number of circumstances, including a software crash, network failure, hardware failure, power loss, or other failure. The host monitoring module 224 may monitor the host partition 204 using any available technique, including monitoring for a heartbeat signal from the host partition 204, establishing a timeout based on the last communication from the host partition 204, actively pinging the host partition 204, or other techniques.

The recovery module 226 is configured to send a request for host state data 214 to the recovery partition 206 of the computing device 102a in response to the host monitoring module 224 determining that the host partition 204 is not responsive. The recovery module 226 is further configured to receive the requested host state data 214 from the recovery partition 206. Of course, the recovery module 226 will only receive a response in circumstances in which the recovery partition 206 remains operational; however, in many typical failure circumstances (such as software crashes) the recovery partition 206 may remain operational. In some embodiments, the recovery module 226 may perform one or more recovery operations after receiving the host state data 214, such as updating the remote state data 104 or restarting the applications of the host partition 204 on the computing device 102a or on another computing device 102.

Figure 3:
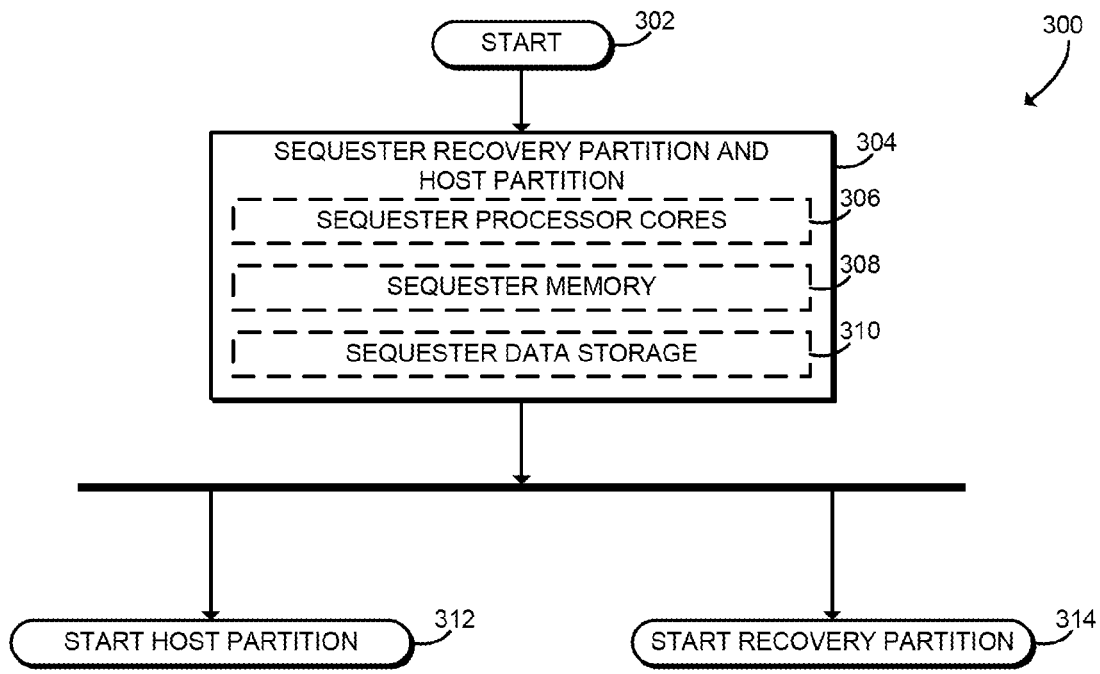
FIG. 3 is a simplified flow diagram of at least one embodiment of a method for partition isolation that may be executed by a computing device of the system of FIGS. 1 and 2.

Referring now to FIG. 3, in use, a computing device 102a may execute a method 300 for isolating the host partition 204 and the recovery partition 206. The method 300 begins in block 302, in which the computing device 102a is started. The computing device 102a may be started in response to powering on the device, in response to a hard or soft reset, or in response to any other event causing the computing device 102a to start processing. The computing device 102a may be started in a mode allowing for complete control of the computing device 102a, including complete control of all hardware components and peripheral devices. For example, the computing device 102a may be started in a firmware execution environment prior to boot of any operating system, hypervisor, virtual machine monitor, or other control system of the computing device 102a.

In block 304, the computing device 102a sequesters the host partition 204 and the recovery partition 206. Sequestering the host partition 204 and the recovery partition 206 controls access to hardware resources of the computing device 102a, such as the processor cores 122, the memory 126, or the data storage 130. For example, the VMM/host OS 208 of the host partition 204 (or applications executed by the VMM/host OS 208) may access certain memory 126 or processor cores 122 and may be denied access to other memory 126 or processer cores 122. Hardware resources may be shared between different partitions with different access rights. For example, the recovery partition 206 may be allowed read-only access to segments of memory 126 that are accessible by the VMM/host OS 208. In some embodiments, communication between the partitions 204, 206 may be performed through controlled communication channels such as firmware mailboxes or interprocess communication. Access controls to hardware resources may be enforced by platform firmware, or by hardware such as the I/O subsystem 124. Accordingly, after sequestration, the recovery partition 206 cannot be compromised or otherwise interfered with by data and/or processes of the host partition 204. In contrast, after sequestration, the recovery partition 206 may be capable of at least read-only access to certain data and/or processes of the host partition 204.

In block 306, the computing device 102a may sequester certain processor cores 122 for the host partition 204 and the recovery partition 206. For example, the computing device 102a may sequester the processor cores 122 in firmware. Sequestering the processor cores 122 establishes a strictly isolating computational partition (not a virtual partition) between subsets of the processor cores 122. For example, in some embodiments, the processor core 122d may be sequestered from the processor cores 122a, 122b, 122c. In that example, the firmware may allow processes executed by the processor core 122d to view the computing device 102a as having a single-core processor 120, and the firmware may allow processes executed by the processor cores 122a, 122b, 122c to view the computing device 102a as having a three-core processor 120. The computing device 102a may assign a smaller subset of the processor cores 122 to the recovery partition 206; for example, the processor core 122d may be assigned to the recovery partition 206, and the processor cores 122a, 122b, 122c may be assigned to the host partition 204. It should be appreciated that the computing device 102a may similarly sequester any strictly isolatable processing resource in addition the processor cores 122, such as physical processors or hardware threads.

Figure 4:
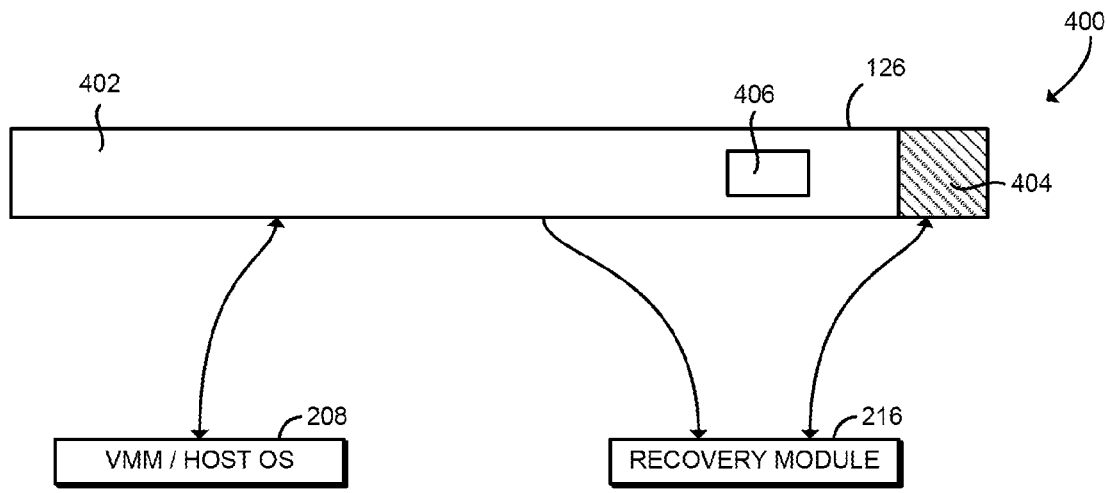
FIG. 4 is a schematic illustration of partitioned memory of the computing device of FIGS. 1 and 2.

In block 308, in some embodiments the computing device 102a may sequester the memory 126 between the host partition 204 and the recovery partition 206. After sequestration, the memory 126 may be shared asymmetrically between the host partition 204 and the recovery partition 206. In some embodiments, the host partition 204 may be prevented from accessing a segment of memory used by the recovery partition 206, whereas the recovery partition 206 may be capable of read-only access to a segment of the memory 126 used by the host partition 204. Access to the memory 126 may be controlled through firmware, page tables, memory management units, or any other memory access control mechanism. Referring now to FIG. 4, a diagram 400 illustrates memory 126 after sequestration. As illustrated, the memory 126 has been partitioned into a host segment 402 and a recovery segment 404. The VMM/host OS 208 of the host partition 204 has full access (i.e. read/write access) to the host segment 402 and no access to the recovery segment 404. The recovery module 216 of the recovery partition 206 has read-only access to the host segment 402 and full access to the recovery segment 404. The host segment 402 further includes a sub-segment 406 that may include the host state index 212. As further described below, the recovery module 216 has read-only access to the sub-segment 406 as well.

Referring back to FIG. 3, in block 310, in some embodiments the computing device 102a may sequester the data storage device 130 between the host partition 204 and the recovery partition 206. Similar to partitioning the memory 126, after sequestration the data storage device 130 may be shared asymmetrically between the host partition 204 and the recovery partition 206. Thus, a segment of the data storage device 130 may be inaccessible to the host partition 204, whereas the recovery partition 206 may have at least read-only access to all of the data storage device 130. Sequestration of the data storage device 130 may be enforced through firmware, volume partitioning, or any other mechanism for controlling access to the data storage device 130.

After sequestering the host partition 204 and the recovery partition 206, the method 300 proceeds concurrently to blocks 312, 314. In block 312, the computing device 102a starts the host partition 204, and in block 314 the computing device 102a starts the recovery partition 206. Each of the partitions 204, 206 may be started by starting an appropriate firmware boot process, operating system loader, or other method for starting a partition. After being started, each of the partitions 204, 206 may continue to run until the computing device 102a is powered down or reset. The partitions 204, 206 execute independently; therefore, as described further below, a crash or compromised state of one of the partitions 204, 206 does not affect the other partition.

Figure 5:
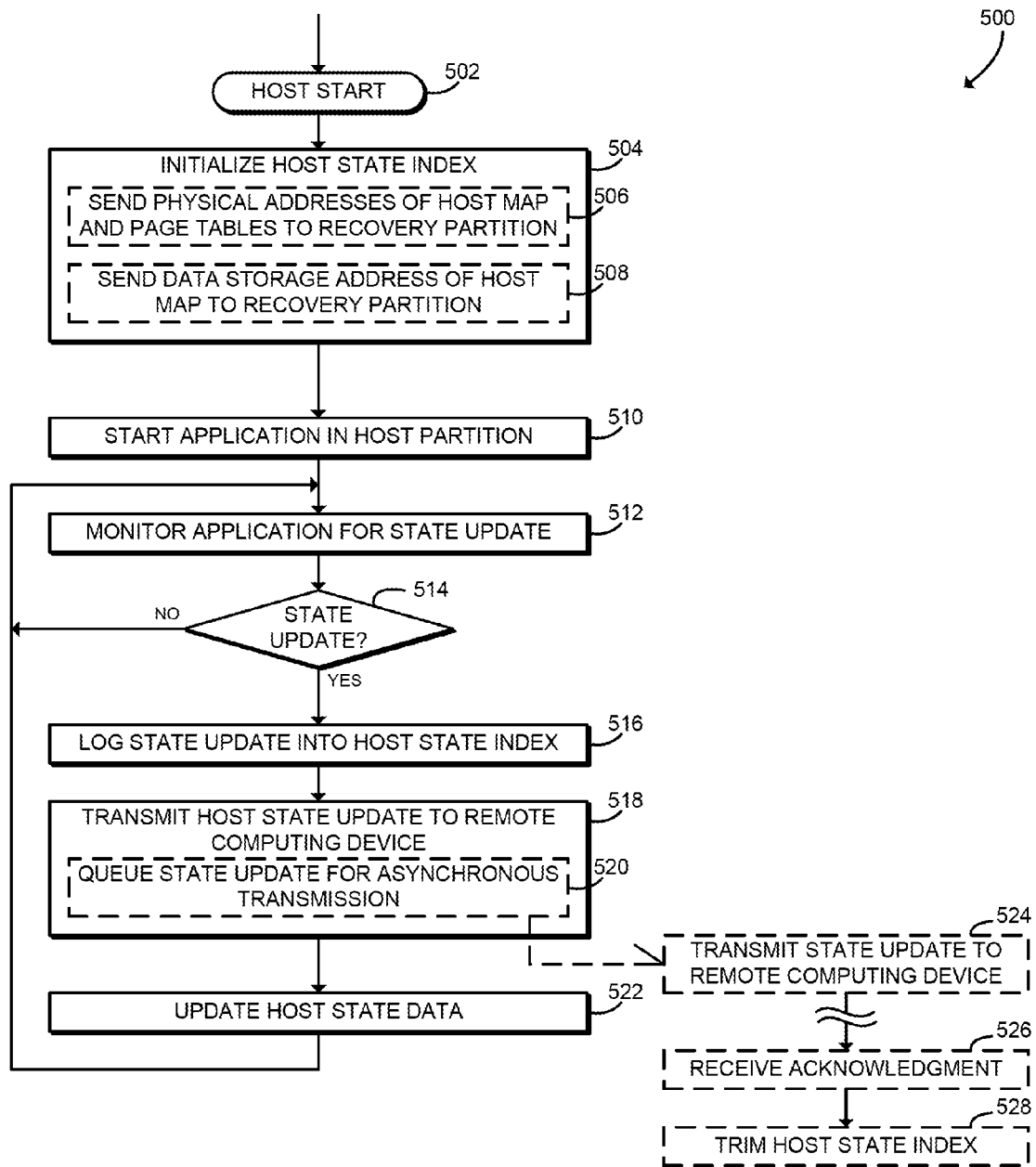
FIG. 5 is a simplified flow diagram of at least one embodiment of a method for updating host state data that may be executed by the computing device of the system of FIGS. 1 and 2.

Referring now to FIG. 5, in use the computing device 102a may execute a method 500 for updating host state data. The method 500 is executed using the host partition 204 of the computing device 102a. For example, the method 500 may be executed using the processor cores 122a, 122b, 122c and referencing the host segment 402 of the memory 126 (see FIG. 4). The method 500 begins in block 502, in which the computing device 102a responds to a host start event. The host start event may be generated when the host partition 204 is initially started, as described above in connection with block 312 of FIG. 3. Additionally or alternatively, a host start event may be generated in response to a software or hardware reset event. In some embodiments, a host start event may be generated in response to a command to start a host instance received from a cloud computing controller (not shown).

In block 504, the computing device 102a initializes the host state index 212. The computing device 102a may allocate, initialize, or otherwise populate a host navigation map to reference application objects of the host partition 204. Additionally or alternatively, the computing device 102a may allocate, initialize, or otherwise populate page translation tables to convert between physical addresses of the computing device 102a to virtual addresses used in the host partition 204. The computing device 102a may also initialize similar data structures for the data storage device 130. Additionally, the computing device 102a may make the host state index 212 accessible to the recovery partition 206. In some embodiments, in block 506 the computing device 102a may send physical addresses of the host navigation map and the page translation tables to the recovery partition 206. The host partition 204 may use any method for communicating data to the recovery partition 206, including transmitting through a firmware mailbox, or placing data at a well-defined physical address. Similarly, in some embodiments in block 508 the computing device 102a may send a data storage address of the host map to the recovery partition 206.

In block 510, the computing device 102a starts an application in the host partition 204. The computing device 102a may start any application desired for use with the system 100. For example, the computing device 102a may start a virtual image specified by a cloud computing controller (not shown). In some embodiments, the computing device 102a may start the VMM/host OS 208, which may in turn start and manage particular applications. The application, applications, or VMM/host OS 208 continues to execute concurrently with the method 500.

In block 512, the computing device 102a monitors the application in the host partition 204 for a host state update. A host state update includes any change in the state of the host partition 204, including a change in the state of an application, applications, virtual machine, operating system, or any other entity operating within the host partition 204. Monitoring for host state updates may be active or passive: that is, active monitoring may be performed explicitly by having all software (e.g., the VMM/host operating system 208 and application layers) call a designated library procedure to register the memory addresses, page addresses, disk blocks, and page table entries that undergo a modification of durable state. Passive monitoring may be performed by using page protection techniques of the VMM/host operating system 208 to trap and log the page addresses or disk block addresses that similarly contain durable state. Thus, in some embodiments, the host state update may include a change to part of the memory 126 or to the data storage device 130. Additionally or alternatively, in some embodiments a state change may include a change to the logical state of an application object. As described above, the computing device 102a may use any technique to monitor for state changes, such as polling for state changes, trapping state changes, or establishing an application programming interface ("API") for receiving state changes. In block 514, the computing device 102a determines whether a state change has been detected. If not, the method 500 loops back to block 512 to continue monitoring for state changes. If a state change has been detected, the method 500 advances to block 516.

In block 516, the computing device 102a logs the state update into the host state index 212. The computing device 102a may update metadata, object names, pointer references, or other indexing information to reflect the state change. In some embodiments, the host state index 212 may be updated to reflect that a state update is pending, allowing host state to remain consistent in the event of a crash prior to completing the host state update. In some embodiments, the computing device 102a may update a file system journal or similar data structure.

In block 518, the computing device 102a transmits the host state update to a remote computing device 102b. The computing device 102a transmits the host state data using a port 136 of the network interface 134 that has been sequestered or otherwise assigned to the host partition 204, for example the port 136a. The remote computing device 102b may be any other computing device 102 of the system 100. In the illustrative embodiment, the remote computing device 102b may be embodied as a high availability or disaster recovery peer that manages copying or replicating the host state data 214 into the remote state data 104. Additionally or alternatively, the remote computing device 102b may be a client or server with respect to one or more applications executing on the computing device 102a, a cloud computing controller, or any other computing device 102 relying on the state of the computing device 102a or the remote state data 104. In some embodiments, in block 520 the computing device 102a queues the state update for asynchronous transmission. That is, the computing device 102a may transmit the state update to the remote computing device 102b without waiting to receive an acknowledgement of receipt, handshake, or other indication that the state update was successfully received by the remote computing device 102b. After transmitting the state update, the method advances to block 522.

In block 522, the computing device 102a updates the host state data 214. After updating the host state data 214, the local state is available to any applications executing locally on the computing device 102a. For example, the memory 126 or the data storage device 130 may be updated to include the updates to the host state data 214. After updating the host state data 214, the method 500 loops back to block 512 to continue monitoring for state updates.

Referring back to block 520, in some embodiments the computing device 102a may queue a state update for asynchronous transmission. In those embodiments, the method 500 may advance to block 524 to transmit the state update. The computing device 102a may spawn a new thread, process, or use any other concurrency mechanism to transmit the state update. In block 524, the computing device 102a transmits the state update to the remote computing device 102b. After some time, in block 526 the computing device 102a may receive an acknowledgment from the remote computing device 102b. The acknowledgment indicates that the state update was successfully received by the remote computing device 102b. In block 528, the computing device 102a may trim the host state index 212 in response to receiving the acknowledgment. The computing device 102a may trim the host state index 212 by removing the state update from an update list, applying the state update to metadata, or otherwise indicating that the state update is no longer outstanding and has successfully been applied. After trimming the host state index 212, this branch of the method 500 may be completed. Because the state update was transmitted asynchronously, there may be no need to rejoin or otherwise update the main loop of blocks 512 through 522.

Figure 6:
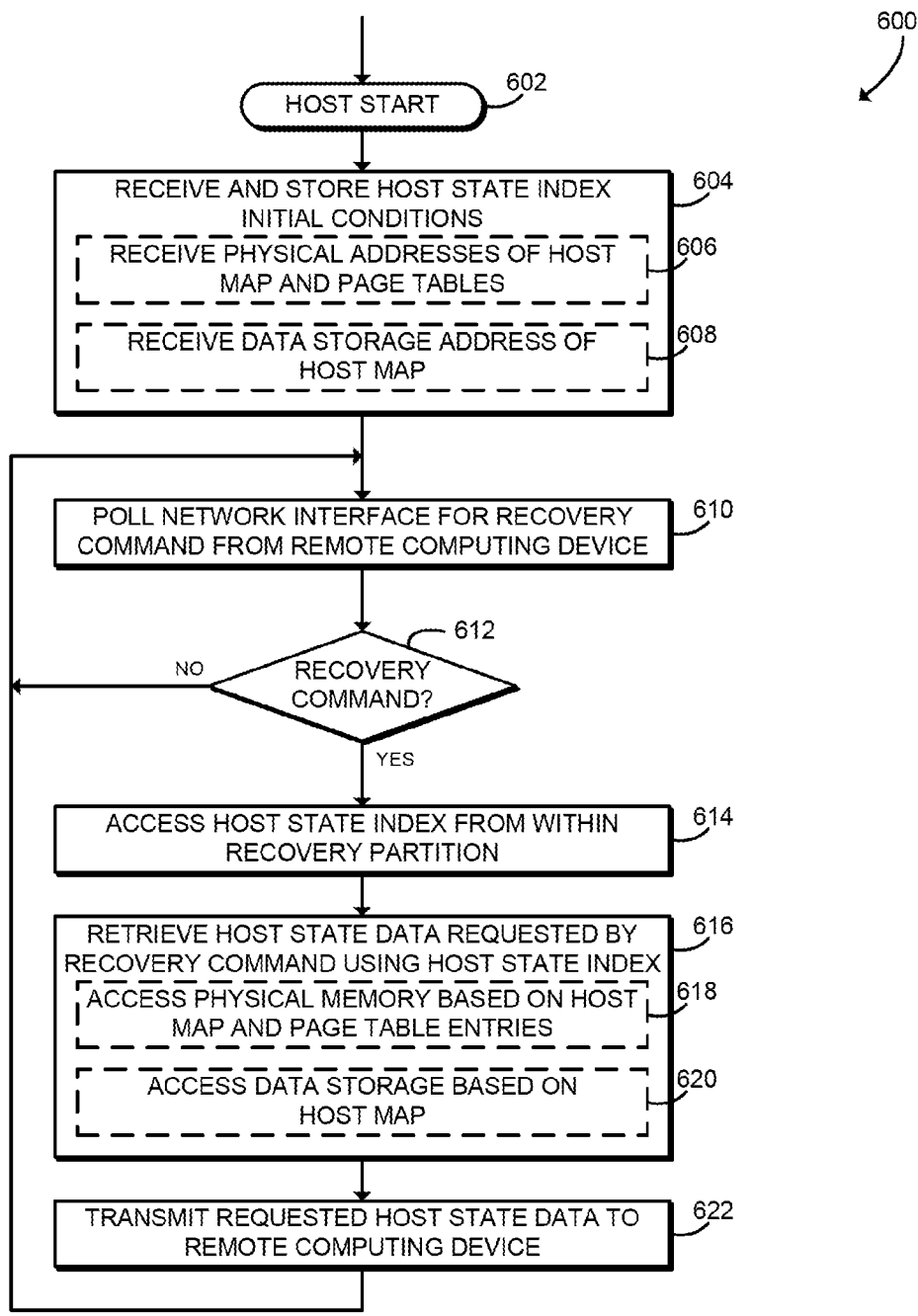
FIG. 6 is a simplified flow diagram of at least one embodiment of a method for recovering host state data that may be executed by the computing device of the system of FIGS. 1 and 2.

Referring now to FIG. 6, in use, the computing device 102a may execute a method 600 for recovering host state data 214. The method 600 is executed using the recovery partition 206 of the computing device 102a. For example, the method 600 may be executed using the processor core 122d and referencing code from the recovery segment 404 of the memory 126 (see FIG. 4). The method 600 begins in block 602, in which the computing device 102a responds to a host start event. The host start event may be generated when the recovery partition 206 is initially started, as described above in connection with block 314 of FIG. 3. Additionally or alternatively, a host start event may be generated in response to a software or hardware reset event. In some embodiments, a host start event may be generated in response to a command to start a host instance received from a cloud computing controller (not shown).

In block 604, the computing device 102a receives and stores initial conditions of the host state index 212. After receiving and storing the initial conditions, the recovery partition 206 of the computing device 102a is capable of accessing and parsing the host state index 212. As described above, the host state index 212 may include a host navigation map to reference application objects of the host partition 204 and may include page translation tables to translate between virtual memory addresses used by the host partition 204 and physical addresses of the computing device 102a. In some embodiments, the host state index 212 may include similar data structures for the data storage device 130. In some embodiments, in block 606, the computing device 102a may receive physical addresses of the host navigation map and page translation tables. The physical addresses may be transferred from the host partition 204 to the recovery partition 206 using any technique for information sharing, such as a firmware mailbox, shared memory at a well-defined physical memory address, or any other technique. In some embodiments, in block 608 the computing device 102a may receive a data storage address of the host navigation map for the data storage device 130. Similarly, the computing device 102a may use any available technique to share the data storage address from the host partition 204 to the recovery partition 206.

In block 610, the computing device 102a polls the network interface 134 for a recovery command from a remote computing device 102b. The computing device 102a may poll the network interface 134 using the RTOS 218 of the recovery partition 206. Polling in a real-time environment—as opposed to an interrupt-based or multitasking approach—allows the operation of the computing device 102a to be predictable and verifiably correct. The computing device 102a may poll a port 136 of the network interface 134 that has been sequestered or otherwise dedicated to the recovery partition 206, such as the port 136b. By using a dedicated port, the computing device 102a enables an independent network path that may be resistant to software failure in the host partition 204. Of course, in some embodiments, the computing device 102a may use the same port 136 and/or network interface 134 for both the host partition 204 and the recovery partition 206.

In block 612, the computing device 102a determines whether a recovery command has been received from a remote computing device 102b. If no command has been received, the method 600 loops back to block 610 to continue polling for recovery commands. If a recovery command has been received, the method 600 advances to block 614.

In block 614, the computing device 102a accesses the host state index 212 from within the recovery partition 206. The computing device 102a may read, copy, open, or otherwise gain access to the host state index 212 from within the recovery partition 206. The host state index 212 may be stored in the memory 126, the data storage device 130, or any combination of those devices. For example, the computing device 102a may use the physical memory addresses of the host navigation map and/or the page translation tables received and stored in block 604 to address the host state index 212 within the memory 126.

In block 616, the computing device 102a retrieves the host state data 214 requested by the recovery command, using the host state index 212. The recovery command may specify one or more application objects to retrieve. In some embodiments, the recovery command may request host state data 214 based on memory or data addresses and offsets used by the host partition 204. The computing device 102*a* may look up the requested application objects in the host state index 212 and use the index information to copy or otherwise retrieve the requested data from the host state data 214. In some embodiments, the recovery command may simply request all of the host state data 214. In those embodiments, the computing device 102*a* may simply iterate through each entry in the host state index 212 to retrieve the requested host state data 214.

In some embodiments, in block 618 the computing device 102*a* may access physical memory 126 of the computing device 102*a* based on the host navigation map and page translation table entries of the host state index 212. For example, the computing device 102*a* may receive a request for host state data 214 associated with a particular application object. The computing device 102*a* may look up the application object in the host navigation map of the host state index 212 and determine a virtual memory address used by the host partition 204. The computing device 102*a* may, in turn, look up that virtual memory address in the page translation table and determine a physical memory address in the memory 126. The computing device 102*a* may retrieve the requested host state data 214 by copying the data at that physical address.

Additionally or alternatively, in block 620 the computing device 102*a* may access data storage device 130 of the computing device 102*a* based on a host navigation map. For example, the computing device 102*a* may receive a request for host state data 214 associated with a particular application object. The computing device 102*a* may look up the application object in the host navigation map of the host state index 212 and determine a storage address used by the host partition 204. The storage address may be embodied as an inode number, logical block number, cylinder-head-sector number, or other address usable to retrieve data from the data storage device 130. The computing device 102*a* may retrieve the requested host state data 214 by copying the data at that storage address.

In block 622, the computing device 102*a* transmits the requested host state data 214 to the remote computing device 102*b*. The computing device 102*a* may transmit raw data such as memory pages or data storage blocks. The computing device 102*a* may transmit the data using a sequestered or dedicated port 136 of the network interface 134. After transmitting the requested host state data 214, the method 600 loops back to block 610 to continue polling for additional recovery commands.

Figure 7:
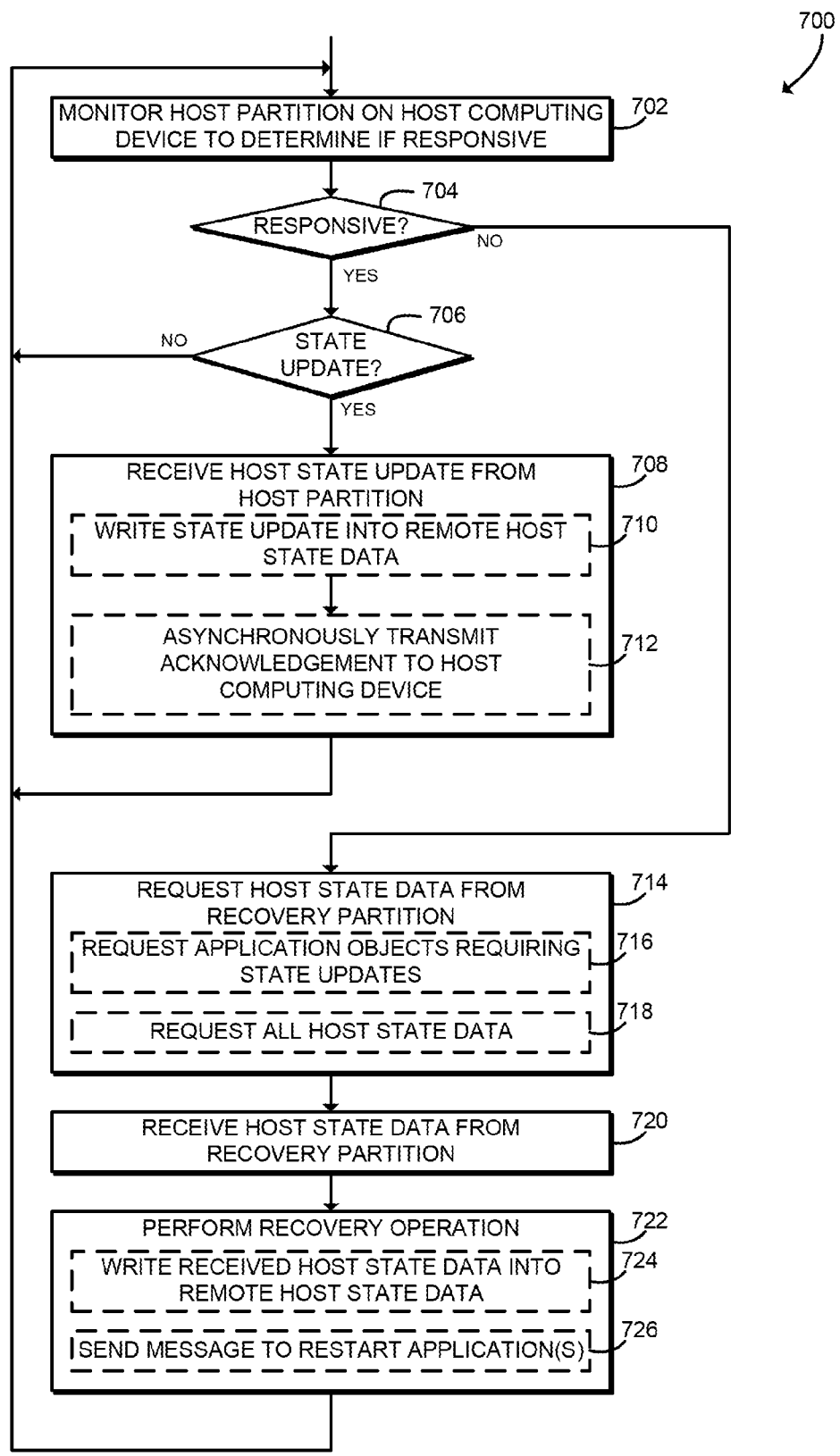
FIG. 7 is a simplified flow diagram of at least one embodiment of a method for remotely receiving and recovering host state data that may be executed by another computing device of the system of FIGS. 1 and 2.

Referring now to FIG. 7, in use, a remote computing device 102*b* may execute a method 700 for remotely receiving and recovering host state data 214. The method 700 begins in block 702, in which the remote computing device 102*b* monitors the host partition 204 on a computing device 102*a* to determine if it is responsive. The host partition 204 may become unresponsive due to hardware or software failure, including failure of the VMM/host OS 208 or any applications of the host partition 204. The remote computing device 102*b* may use any method to determine whether the host partition 204 is responsive. For example, the remote computing device 102*b* may monitor for a heartbeat signal received from the host partition 204, maintain a timer since the last communication was received from the host partition 204, or actively probe the host partition 204, for example by pinging the host partition. Additionally or alternatively, the host partition 204 may itself request that it be treated as non-responsive by having an the VMM/host operating system 208 or an application issue a message to the remote computing device 102*b* to treat the host partition 204 as unresponsive when, for example, the host partition 204 has determined that it requires such outside assistance. In block 704, the remote computing device 102*b* determines whether the host partition 204 is responsive. If not responsive, the method 700 branches ahead to block 714, described below. If responsive, the method 700 advances to block 706.

In block 706, the remote computing device 102*b* determines whether updated host state data 214 is available for the computing device 102*a*. The remote computing device 102*b* may poll the host partition 204 to request state updates, listen for connections from the host partition 204, receive multicast state updates from the host partition 204, or perform any other action to detect a host state update. If no host state update is available, the method 700 loops back to block 702 to continue monitoring the host partition 204 for responsiveness. If a host state update is available, the method 700 advances to block 708.

In block 708, the remote computing device 102*b* receives the updated host state data 214 from the host partition 204. The remote computing device 102*b* may receive the host state update from a port 136 of the computing device 102*a* that has been sequestered or otherwise dedicated to the host partition 204. After receiving the host state update, the remote computing device 102*b* may perform any action required by the application(s) of the host partition 204 and/or the system 100. For example, in the illustrative embodiment the remote computing device 102*b* is a high availability/disaster recovery peer of the computing device 102*a*, and thus the remote computing device 102*b* records all host state data 214 received from the host partition 204. In some embodiments, in block 710 the remote computing device 102*b* writes the updated host state data 214 into the remote state data 104. As described above, the remote state data 104 may be stored by the remote computing device 102*b* or otherwise accessible to the remote computing device 102*b*, for example as cloud storage. After writing the remote state data 104, in some embodiments in block 712 the remote computing device 102*b* asynchronously transmits an acknowledgment to the host partition 204 of the computing device 102*a*. After receiving the host state update, the method 700 loops back to block 702 to continue monitoring the host partition 204 for responsiveness.

Referring back to block 704, if the remote computing device 102*b* determines that the host partition 204 is not responsive, the method 700 branches ahead to block 714. In block 714, the remote computing device 102*b* requests host state data 214 from the recovery partition 206 of the computing device 102*a*. The remote computing device 102*b* may transmit a recovery command requesting the host state data 214 to a network port 136 that has been sequestered or otherwise dedicated to the recovery partition 206. To the remote computing device 102*b*, that sequestered network port 136 may appear to be a separate host on the network 106. The remote computing device 102*b* may request particular application objects or addresses within the host state data 214. In some embodiments, in block 716 the remote computing device 102*b* may request application objects that require state updates. For example, the remote computing device 102*b* may request state updates for all application objects involved in a transaction that was active when the host partition became unresponsive. In some embodiments, in block 718 the remote computing device 102*b* may request all host state data 214 from the recovery partition 206.

In block 720, the remote computing device 102*b* receives the requested host state data 214 from the recovery partition 206 of the computing device 102*a*. The host state data 214 received may be a complete copy of the host state data 214 stored on the computing device 102a, or a subset of the host state data 214 based on the requested application objects.

In block 722, the remote computing device 102b performs a recovery operation based on the received host state data 214. The remote computing device 102b may perform any recovery operation to allow the system 100 to proceed and recovery from software failure of the host partition 204. In some embodiments, in block 724 the remote computing device 102b writes the received host state data 214 into the remote state data 104, which may in turn be replicated among all of the computing devices 102 of the system 100. Writing the remote state data 104 may allow other computing devices 102 of the system 100 to continue operating normally without missing any changes made to the host state data 214 by the host partition 204 prior to failure. In some embodiments, in block 726 the remote computing device 102b may send a message to restart the application(s) of the host partition 204. The remote computing device 102b may send the message directly to the computing device 102a and/or the host partition 204, may send the message internally to a host partition 204 established on the remote computing device 102b, or may send the message to a third computing device such as a cloud computing controller. Restarting the application(s) may be achieved by, for example, sending a host start event to the computing device 102a that causes the computing device 102a to restart or the host partition 204 and/or its applications and the recovery partition 206 to reset and continue normal operation. Further, in some embodiments the recovery partition 206 may direct the computing device 102a to perform a safe restart into a self-diagnostic and self-repair mode after the recovery partition 206 has read the requested host state data 214. Additionally or alternatively, restarting the application(s) may be achieved by sending a host start message to a different computing device 102 of the system 100, such as the remote computing device 102b or a third computing device 102. In such embodiments, the host start message may be sent to a "hot swap" or "failover" computing device 102 that is capable of quickly restarting the application(s) using the remote state data 104, which includes the host state data 214 received from the recovery partition 206. Thus, the system 100 may be capable of quick recovery from failures. After performing the recovery operation, the method 700 loops back to block 702 to continue monitoring the computing device 102a for responsiveness.

Although the illustrative method 700 includes both receiving remote host state data 214 from the host partition 204 in blocks 706-712 and monitoring the host partition 204 for responsiveness and recovering host state data 214 in blocks 702-704, 714-726, it should be understood that in some embodiments those functions may be performed by multiple processes. For example, one process may monitor the computing device 102a for responsiveness, and another concurrent process may manage receiving and/or requesting host state data 214 from the computing device 102a.

EXAMPLES

Illustrative examples of the technologies disclosed herein are provided below. An embodiment of the technologies may include any one or more, and any combination of, the examples described below.

Example 1 includes a computing device for providing virtual multipath state access, the computing device comprising an isolation module to sequester a recovery partition from a host partition, wherein one or more resources of the host partition are accessible to the recovery partition; and a recovery module established by the recovery partition, the recovery module to: receive a request for host state data of the host partition from a remote computing device, the request being an indication that the host partition has failed; retrieve the host state data requested by the request using a host state index maintained by the host partition, the host state index to identify a location of the host state data; and transmit the requested host state data to the remote computing device.

Example 2 includes the subject matter of Example 1, and wherein to sequester the recovery partition from the host partition comprises to partition a memory of the computing device into a host memory segment and a recovery memory segment; wherein the host memory segment (i) includes the host state data and the host state index and (ii) is accessible to the recovery partition; and wherein the recovery memory segment is not accessible to the host partition.

Example 3 includes the subject matter of any of Examples 1 and 2, and wherein the host partition is to initialize a base physical address of the host state index in the host memory segment; and the recovery module is further to read the base physical address of the host state index.

Example 4 includes the subject matter of any of Examples 1-3, and wherein to retrieve the host state data comprises to retrieve one or more memory pages of the host memory segment using the host state index.

Example 5 includes the subject matter of any of Examples 1-4, and wherein the host partition is further to initialize a base physical address of a page translation table in the host memory segment; and the recovery module is further to read the base physical address of the page translation table; wherein to retrieve the one or more memory pages comprises to retrieve one or more memory pages of the host memory segment using the host state index and the page translation table.

Example 6 includes the subject matter of any of Examples 1-5, and wherein to sequester the recovery partition from the host partition comprises to partition a data storage device of the computing device into a host data partition, wherein the host data partition (i) includes the host state data and the host state index and (ii) is accessible to the recovery partition.

Example 7 includes the subject matter of any of Examples 1-6, and wherein the host partition is to initialize a base storage address of the host state index in the host data partition; and the recovery module is to read the base storage address of the host state index.

Example 8 includes the subject matter of any of Examples 1-7, and wherein to retrieve the host state data comprises to retrieve one or more blocks of the host data partition using the host state index.

Example 9 includes the subject matter of any of Examples 1-8, and wherein to sequester the recovery partition from the host partition comprises to sequester a processor core of a plurality of processor cores of the computing device to the recovery partition; and assign the remainder of the plurality of processor cores to the host partition; wherein the sequestered processor core is inaccessible to the host partition and the remainder of the plurality of processor cores is inaccessible to the recovery partition.

Example 10 includes the subject matter of any of Examples 1-9, and wherein to sequester the recovery partition from the host partition comprises to: assign a first network interface of the computing device to the host partition, wherein the first network interface is inaccessible to the recovery partition; and assign a second network interface of the computing device to the recovery partition, wherein the second network interface is inaccessible to the host partition; wherein to receive the request for host state data comprises to receive the request for host state data using the second network interface.

Example 11 includes the subject matter of any of Examples 1-10, and further including a state update module maintained by the host partition to transmit host state data to the remote computing device using the first network interface.

Example 12 includes the subject matter of any of Examples 1-11, and wherein the recovery module is further to poll the second network interface of the computing device for the request for host state data, using a real-time operating system of the recovery partition.

Example 13 includes the subject matter of any of Examples 1-12, and further including a state update module maintained by the host partition to (i) log a host state update in the host state index and (ii) update host state data of the host partition based on the host state update.

Example 14 includes a remote computing device for virtual multipathing, the remote computing device comprising a state synchronization module to receive host state data from a host partition of a computing device; a host monitoring module to determine whether the host partition of the computing device is responsive; and a recovery module to (i) request an update of the host state data from a recovery partition of the computing device in response to a determination that the host partition of the computing device is not responsive, and (ii) receive the requested host state data from the recovery partition in response to the request.

Example 15 includes the subject matter of Example 14, and wherein to request the update of the host state data comprises to request an application object.

Example 16 includes the subject matter of any of Examples 14 and 15, and wherein to request the update of the host state data comprises to request all host state data from the recovery partition.

Example 17 includes the subject matter of any of Examples 14-16, and wherein the recovery module is further to perform a recovery operation based on the received host state data.

Example 18 includes the subject matter of any of Examples 14-17, and wherein the state synchronization module is further to (i) store the host state data from the host partition in remote state data of the remote computing device; and (ii) update the remote state data using the requested host state data received from the recovery partition; wherein to perform the recovery operation comprises to perform the recovery operation using the remote state data.

Example 19 includes the subject matter of any of Examples 14-18, and wherein to perform the recovery operation comprises to restart the host partition.

Example 20 includes the subject matter of any of Examples 14-19, and wherein to restart the host partition comprises to restart the host partition on the computing device, on the remote computing device, or on a second computing device.

Example 21 includes a method for providing virtual multipath state access, the method comprising sequestering, by a computing device, a recovery partition from a host partition, wherein one or more resources of the host partition are accessible to the recovery partition; receiving, by the recovery partition of the computing device, a request for host state data of the host partition from a remote computing device, the request indicating the host partition has failed; retrieving, by the recovery partition of the computing device, the host state data requested by the request using a host state index maintained by the host partition, the host state index identifying a location of the host state data; and transmitting, by the recovery partition of the computing device, the requested host state data to the remote computing device.

Example 22 includes the subject matter of Example 21, and wherein sequestering the recovery partition from the host partition comprises partitioning a memory of the computing device into a host memory segment and a recovery memory segment; wherein the host memory segment (i) includes the host state data and the host state index and (ii) is accessible to the recovery partition; and wherein the recovery memory segment is not accessible to the host partition.

Example 23 includes the subject matter of any of Examples 21 and 22, and further including initializing, by the host partition of the computing device, a base physical address of the host state index in the host memory segment; and reading, by the recovery partition of the computing device, the base physical address of the host state index.

Example 24 includes the subject matter of any of Examples 21-23, and wherein retrieving the host state data comprises retrieving one or more memory pages of the host memory segment using the host state index.

Example 25 includes the subject matter of any of Examples 21-24, and further including initializing, by the host partition of the computing device, a base physical address of a page translation table in the host memory segment; and reading, by the recovery partition of the computing device, the base physical address of the page translation table; wherein retrieving the one or more memory pages comprises retrieving one or more memory pages of the host memory segment using the host state index and the page translation table.

Example 26 includes the subject matter of any of Examples 21-25, and wherein sequestering the recovery partition from the host partition comprises partitioning a data storage device of the computing device into a host data partition, wherein the host data partition (i) includes the host state data and the host state index and (ii) is accessible to the recovery partition.

Example 27 includes the subject matter of any of Examples 21-26, and further including initializing, by the host partition of the computing device, a base storage address of the host state index in the host data partition; and reading, by the recovery partition of the computing device, the base storage address of the host state index.

Example 28 includes the subject matter of any of Examples 21-27, and wherein retrieving the host state data comprises retrieving one or more blocks of the host data partition using the host state index.

Example 29 includes the subject matter of any of Examples 21-28, and wherein sequestering the recovery partition from the host partition comprises sequestering a processor core of a plurality of processor cores of the computing device to the recovery partition; and assigning the remainder of the plurality of processor cores to the host partition; wherein the sequestered processor core is inaccessible to the host partition and the remainder of the plurality of processor cores is inaccessible to the recovery partition.

Example 30 includes the subject matter of any of Examples 21-29, and wherein sequestering the recovery partition from the host partition comprises: assigning a first network interface of the computing device to the host partition, wherein the first network interface is inaccessible to the recovery partition; and assigning a second network interface of the computing device to the recovery partition, wherein the second network interface is inaccessible to the host partition; wherein receiving the request for host state data comprises receiving the request for host state data using the second network interface.

Example 31 includes the subject matter of any of Examples 21-30, and further including transmitting, by the host partition of the computing device, host state data to the remote computing device using the first network interface.

Example 32 includes the subject matter of any of Examples 21-31, and further including polling, by the recovery partition of the computing device, the second network interface of the computing device for the request for host state data, using a real-time operating system of the recovery partition.

Example 33 includes the subject matter of any of Examples 21-32, and further including logging, by the host partition of the computing device, a host state update in a host state index of the host partition; and updating, by the host partition of the computing device, host state data of the host partition based on the host state update.

Example 34 includes a method for virtual multipathing, the method comprising receiving, by a remote computing device, host state data from a host partition of a computing device; determining, by the remote computing device, whether the host partition of the computing device is responsive; requesting, by the remote computing device, an update of the host state data from a recovery partition of the computing device in response to determining that the host partition of the computing device is not responsive; and receiving, by the remote computing device, the requested host state data from the recovery partition in response to the request.

Example 35 includes the subject matter of Example 34, and wherein requesting the update of the host state data comprises requesting an application object.

Example 36 includes the subject matter of any of Examples 34 and 35, and wherein requesting the update of the host state data comprises requesting all host state data from the recovery partition.

Example 37 includes the subject matter of any of Examples 34-36, and further including performing, by the remote computing device, a recovery operation based on the received host state data.

Example 38 includes the subject matter of any of Examples 34-37, and further including storing, by the remote computing device, the host state data from the host partition in remote state data of the remote computing device; and updating, by the remote computing device, the remote state data using the host state data update received from the recovery partition; wherein performing the recovery operation comprises performing the recovery operation using the remote state data.

Example 39 includes the subject matter of any of Examples 34-38, and wherein performing the recovery operation comprises restarting the host partition.

Example 40 includes the subject matter of any of Examples 34-39, and wherein restarting the host partition comprises restarting the host partition on the computing device, on the remote computing device, or on a second computing device.

Example 41 includes a computing device comprising a processor; and a memory having stored therein a plurality of instructions that when executed by the processor cause the computing device to perform the method of any of Examples 21-40.

Example 42 includes one or more machine readable storage media comprising a plurality of instructions stored thereon that in response to being executed result in a computing device performing the method of any of Examples 21-40.

Example 43 includes a computing device comprising means for performing the method of any of Examples 21-40.

Example 44 includes a computing device for providing virtual multipath state access, the computing device comprising means for sequestering a recovery partition from a host partition, wherein one or more resources of the host partition are accessible to the recovery partition; means for receiving, by the recovery partition, a request for host state data of the host partition from a remote computing device, the request indicating the host partition has failed; means for retrieving, by the recovery partition, the host state data requested by the request using a host state index maintained by the host partition, the host state index identifying a location of the host state data; and means for transmitting, by the recovery partition, the requested host state data to the remote computing device.

Example 45 includes the subject matter of Example 44, and wherein the means for sequestering the recovery partition from the host partition comprises means for partitioning a memory of the computing device into a host memory segment and a recovery memory segment; wherein the host memory segment (i) includes the host state data and the host state index and (ii) is accessible to the recovery partition; and wherein the recovery memory segment is not accessible to the host partition.

Example 46 includes the subject matter of any of Examples 44 and 45, and further including means for initializing, by the host partition, a base physical address of the host state index in the host memory segment; and means for reading, by the recovery partition, the base physical address of the host state index.

Example 47 includes the subject matter of any of Examples 44-46, and wherein the means for retrieving the host state data comprises means for retrieving one or more memory pages of the host memory segment using the host state index.

Example 48 includes the subject matter of any of Examples 44-47, and further including means for initializing, by the host partition, a base physical address of a page translation table in the host memory segment; and means for reading, by the recovery partition, the base physical address of the page translation table; wherein the means for retrieving the one or more memory pages comprises means for retrieving one or more memory pages of the host memory segment using the host state index and the page translation table.

Example 49 includes the subject matter of any of Examples 44-48, and wherein the means for sequestering the recovery partition from the host partition comprises means for partitioning a data storage device of the computing device into a host data partition, wherein the host data partition (i) includes the host state data and the host state index and (ii) is accessible to the recovery partition.

Example 50 includes the subject matter of any of Examples 44-49, and further including means for initializing, by the host partition, a base storage address of the host state index in the host data partition; and means for reading, by the recovery partition, the base storage address of the host state index.

Example 51 includes the subject matter of any of Examples 44-50, and wherein the means for retrieving the host state data comprises means for retrieving one or more blocks of the host data partition using the host state index.

Example 52 includes the subject matter of any of Examples 44-51, and wherein the means for sequestering the recovery partition from the host partition comprises: means for sequestering a processor core of a plurality of processor cores of the computing device to the recovery partition; and means for assigning the remainder of the plurality of processor cores to the host partition; wherein the sequestered processor core is inaccessible to the host partition and the remainder of the plurality of processor cores is inaccessible to the recovery partition.

Example 53 includes the subject matter of any of Examples 44-52, and wherein the means for sequestering the recovery partition from the host partition comprises: means for assigning a first network interface of the computing device to the host partition, wherein the first network interface is inaccessible to the recovery partition; and means for assigning a second network interface of the computing device to the recovery partition, wherein the second network interface is inaccessible to the host partition; wherein the means for receiving the request for host state data comprises means for receiving the request for host state data using the second network interface.

Example 54 includes the subject matter of any of Examples 44-53, and further including means for transmitting, by the host partition, host state data to the remote computing device using the first network interface.

Example 55 includes the subject matter of any of Examples 44-54, and further including means for polling, by the recovery partition, the second network interface of the computing device for the request for host state data, using a real-time operating system of the recovery partition.

Example 56 includes the subject matter of any of Examples 44-55, and further including means for logging, by the host partition, a host state update in a host state index of the host partition; and means for updating, by the host partition, host state data of the host partition based on the host state update.

Example 57 includes a remote computing device for virtual multipathing, the remote computing device comprising means for receiving host state data from a host partition of a computing device; means for determining whether the host partition of the computing device is responsive; means for requesting an update of the host state data from a recovery partition of the computing device in response to determining that the host partition of the computing device is not responsive; and means for receiving the requested host state data from the recovery partition in response to the request.

Example 58 includes the subject matter of Example 57, and wherein the means for requesting the update of the host state data comprises means for requesting an application object.

Example 59 includes the subject matter of any of Examples 57 and 58, and wherein the means for requesting the update of the host state data comprises means for requesting all host state data from the recovery partition.

Example 60 includes the subject matter of any of Examples 57-59, and further including means for performing a recovery operation based on the received host state data.

Example 61 includes the subject matter of any of Examples 57-60, and further including means for storing the host state data from the host partition in remote state data of the remote computing device; and means for updating the remote state data using the host state data update received from the recovery partition; wherein the means for performing the recovery operation comprises means for performing the recovery operation using the remote state data.

Example 62 includes the subject matter of any of Examples 57-61, and wherein the means for performing the recovery operation comprises means for restarting the host partition.

Example 63 includes the subject matter of any of Examples 57-62, and wherein the means for restarting the host partition comprises means for restarting the host partition on the computing device, on the remote computing device, or on a second computing device.

The invention claimed is:

1. A computing device for providing virtual multipath state access, the computing device comprising:
   an isolation module to sequester a recovery partition from a host partition, wherein one or more resources of the host partition are accessible to the recovery partition; and
   a recovery module established by the recovery partition, the recovery module to:
   receive a request for host state data of the host partition from a remote computing device, the request being an indication that the host partition has failed;
   retrieve the host state data requested by the request using a host state index maintained by the host partition, the host state index to identify a location of the host state data; and
   transmit the requested host state data to the remote computing device.

2. The computing device of claim 1, wherein:
to sequester the recovery partition from the host partition comprises to partition a memory of the computing device into a host memory segment and a recovery memory segment;
wherein the host memory segment (i) includes the host state data and the host state index and (ii) is accessible to the recovery partition; and
wherein the recovery memory segment is not accessible to the host partition.

3. The computing device of claim 2, wherein:
the host partition is to initialize a base physical address of the host state index in the host memory segment; and
the recovery module is further to read the base physical address of the host state index.

4. The computing device of claim 3, wherein:
the host partition is further to initialize a base physical address of a page translation table in the host memory segment; and
the recovery module is further to read the base physical address of the page translation table;
wherein to retrieve the host state data comprises to retrieve one or more memory pages of the host memory segment using the host state index and the page translation table.

5. The computing device of claim 1, wherein to sequester the recovery partition from the host partition comprises to partition a data storage device of the computing device into a host data partition, wherein the host data partition (i) includes the host state data and the host state index and (ii) is accessible to the recovery partition.

6. The computing device of claim 1, wherein to sequester the recovery partition from the host partition comprises to:
   sequester a processor core of a plurality of processor cores of the computing device to the recovery partition; and
   assign the remainder of the plurality of processor cores to the host partition;

wherein the sequestered processor core is inaccessible to the host partition and the remainder of the plurality of processor cores is inaccessible to the recovery partition.

7. The computing device of claim 1, wherein:
to sequester the recovery partition from the host partition comprises to:
assign a first network interface of the computing device to the host partition, wherein the first network interface is inaccessible to the recovery partition; and
assign a second network interface of the computing device to the recovery partition, wherein the second network interface is inaccessible to the host partition;
wherein to receive the request for host state data comprises to receive the request for host state data using the second network interface.

8. The computing device of claim 7, further comprising a state update module maintained by the host partition to transmit host state data to the remote computing device using the first network interface.

9. The computing device of claim 7, wherein the recovery module is further to poll the second network interface of the computing device for the request for host state data, using a real-time operating system of the recovery partition.

10. The computing device of claim 1, further comprising a state update module maintained by the host partition to (i) log a host state update in the host state index and (ii) update host state data of the host partition based on the host state update.

11. A method for providing virtual multipath state access, the method comprising:
sequestering, by a computing device, a recovery partition from a host partition, wherein one or more resources of the host partition are accessible to the recovery partition;
receiving, by the recovery partition of the computing device, a request for host state data of the host partition from a remote computing device, the request indicating the host partition has failed;
retrieving, by the recovery partition of the computing device, the host state data requested by the request using a host state index maintained by the host partition, the host state index identifying a location of the host state data; and
transmitting, by the recovery partition of the computing device, the requested host state data to the remote computing device.

12. The method of claim 11, wherein:
sequestering the recovery partition from the host partition comprises partitioning a memory of the computing device into a host memory segment and a recovery memory segment;
wherein the host memory segment (i) includes the host state data and the host state index and (ii) is accessible to the recovery partition; and
wherein the recovery memory segment is not accessible to the host partition.

13. The method of claim 11, wherein:
sequestering the recovery partition from the host partition comprises partitioning a data storage device of the computing device into a host data partition, wherein the host data partition (i) includes the host state data and the host state index and (ii) is accessible to the recovery partition.

14. The method of claim 11, wherein sequestering the recovery partition from the host partition comprises:
sequestering a processor core of a plurality of processor cores of the computing device to the recovery partition; and
assigning the remainder of the plurality of processor cores to the host partition;
wherein the sequestered processor core is inaccessible to the host partition and the remainder of the plurality of processor cores is inaccessible to the recovery partition.

15. The method of claim 11, wherein:
sequestering the recovery partition from the host partition comprises:
assigning a first network interface of the computing device to the host partition, wherein the first network interface is inaccessible to the recovery partition; and
assigning a second network interface of the computing device to the recovery partition, wherein the second network interface is inaccessible to the host partition;
wherein receiving the request for host state data comprises receiving the request for host state data using the second network interface.

16. One or more non-transitory, computer-readable storage media comprising a plurality of instructions that in response to being executed cause a computing device to:
sequester a recovery partition from a host partition, wherein one or more resources of the host partition are accessible to the recovery partition;
receive, by the recovery partition, a request for host state data of the host partition from a remote computing device, the request indicating the host partition has failed;
retrieve, by the recovery partition, the host state data requested by the request using a host state index maintained by the host partition, the host state index identifying a location of the host state data; and
transmit, by the recovery partition, the requested host state data to the remote computing device.

17. The one or more non-transitory, computer-readable storage media of claim 16, wherein:
to sequester the recovery partition from the host partition comprises to partition a memory of the computing device into a host memory segment and a recovery memory segment;
wherein the host memory segment (i) includes the host state data and the host state index and (ii) is accessible to the recovery partition; and
wherein the recovery memory segment is not accessible to the host partition.

18. The one or more non-transitory, computer-readable storage media of claim 16, wherein:
to sequester the recovery partition from the host partition comprises to partition a data storage device of the computing device into a host data partition, wherein the host data partition (i) includes the host state data and the host state index and (ii) is accessible to the recovery partition.

19. The one or more non-transitory, computer-readable storage media of claim 16, wherein to sequester the recovery partition from the host partition comprises to:
sequester a processor core of a plurality of processor cores of the computing device to the recovery partition; and
assign the remainder of the plurality of processor cores to the host partition;
wherein the sequestered processor core is inaccessible to the host partition and the remainder of the plurality of processor cores is inaccessible to the recovery partition.

20. The one or more non-transitory, computer-readable storage media of claim 16, wherein:

to sequester the recovery partition from the host partition comprises to:

assign a first network interface of the computing device to the host partition, wherein the first network interface is inaccessible to the recovery partition; and assign a second network interface of the computing device to the recovery partition, wherein the second network interface is inaccessible to the host partition;

wherein to receive the request for host state data comprises to receive the request for host state data using the second network interface.

* * * * *